(12) United States Patent
Heap (10) Patent No.: US 8,265,813 B2
(45) Date of Patent: *Sep. 11, 2012

(54) METHOD AND CONTROL ARCHITECTURE FOR OPTIMIZATION OF ENGINE FUEL-CUTOFF SELECTION AND ENGINE INPUT TORQUE FOR A HYBRID POWERTRAIN SYSTEM

(75) Inventor: Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1400 days.

This patent is subject to a terminal disclaimer.

(21) Appl. No.: 11/853,184

(22) Filed: Sep. 11, 2007

(65) Prior Publication Data

US 2009/0070019 A1   Mar. 12, 2009

(51) Int. Cl.
    *B60L 11/00*   (2006.01)
(52) U.S. Cl. ............................................ 701/22; 701/51
(58) Field of Classification Search ............... 701/22, 701/51, 54, 101, 112; 477/3, 5
    See application file for complete search history.

(56) References Cited

U.S. PATENT DOCUMENTS

| | | | |
|---|---|---|---|
| 6,081,042 A * | 6/2000 | Tabata et al. ................. 290/45 |
| 6,278,915 B1 * | 8/2001 | Deguchi et al. ............... 701/22 |
| 6,554,088 B2 * | 4/2003 | Severinsky et al. ......... 180/65.23 |
| 6,832,148 B1 | 12/2004 | Bennett |
| 6,868,318 B1 | 3/2005 | Cawthorne |
| 6,886,649 B2 * | 5/2005 | Wakashiro et al. ......... 180/65.26 |
| 7,154,236 B1 | 12/2006 | Heap |
| 7,983,823 B2 * | 7/2011 | Heap .......................... 701/51 |
| 2003/0217876 A1 * | 11/2003 | Severinsky et al. ......... 180/65.2 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0205379 A1 * | 9/2005 | Tryon et al. ................. 192/70.17 |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |

(Continued)

*Primary Examiner* — John Kwon (57) ABSTRACT

There is provided a method and article of manufacture for operating an internal combustion engine adapted to transmit torque to a hybrid transmission. The method comprises determining an engine input torque transmittable to the hybrid transmission for a plurality of engine states, the engine states comprising a fueled-engine operation and an engine fuel-cutoff operation. Costs are determined costs for operating the engine and hybrid transmission in the engine states to substantially meet an operator torque request. The engine state is controlled to one of the fueled-engine operation and the engine fuel-cutoff operation based upon the costs.

20 Claims, 10 Drawing Sheets

U.S. PATENT DOCUMENTS

| | | |
|---|---|---|
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2005/0257967 A1* | 11/2005 | Vahabzadeh et al. ........ 180/65.2 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1* | 5/2008 | Heap .............................. 701/54 |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0118917 A1 | 5/2009 | Sah |
| 2009/0144002 A1 | 6/2009 | Zettel |

* cited by examiner

METHOD AND CONTROL ARCHITECTURE FOR OPTIMIZATION OF ENGINE FUEL-CUTOFF SELECTION AND ENGINE INPUT TORQUE FOR A HYBRID POWERTRAIN SYSTEM

TECHNICAL FIELD

This invention pertains generally to control systems for powertrain control systems employing electro-mechanical transmissions.

BACKGROUND OF THE INVENTION

The statements in this section merely provide background information related to the present disclosure and may not constitute prior art.

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit.

Engineers implementing powertrain systems having electro-mechanical transmissions are tasked with implementing control schemes to monitor system states and control operation of various systems and actuators to effectively control powertrain operation. Such a system is described hereinafter.

SUMMARY OF THE INVENTION

In accordance with an embodiment of the invention, there is a method for operating an internal combustion engine adapted to transmit torque to a hybrid transmission. The method comprises determining an input torque transmittable to the hybrid transmission for a plurality of engine states, the engine states comprising a fueled-engine operation and an engine fuel-cutoff operation. Costs are determined for operating the engine and hybrid transmission in the engine states to substantially meet an operator torque request. The engine state is controlled to one of the fueled-engine operation and the engine fuel-cutoff operation based upon the costs.

An embodiment of the invention comprises the method intended for execution in a control system for a hybrid powertrain system including an internal combustion engine and an electro-mechanical transmission, is provided. The preferred control system comprises a distributed control module architecture comprising a plurality of signally connected control modules. The method, executed as machine-readable code in one or more control modules includes operating the internal combustion engine adapted to transmit torque to the hybrid transmission, comprising: determining input torque transmittable to the hybrid transmission for each of a plurality of engine states. Preferred costs for the engine states are determined. A preferred engine state is selected based upon the preferred costs for the engine states. The engine is controlled based upon the preferred engine state to substantially meet an operator torque request.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Referring now to the drawings, wherein the showings are for the purpose of illustrating the invention only and not for the purpose of limiting the same, a tactical control scheme for operating an internal combustion engine adapted to transmit torque to a hybrid transmission system is now described. The tactical control scheme, depicted with reference to FIGS. 3-9 is preferably executed as one or more algorithms in an electronic control module.

The method comprises determining input torque transmittable to the hybrid transmission for each of a plurality of engine states comprising a fueled-engine operation and an engine fuel-cutoff operation, and determining preferred costs for operating the engine and hybrid transmission in the engine states to substantially meet an operator torque request. The engine state is controlled to one of the fueled-engine operation and the engine fuel-cutoff operation based upon the costs.

The method includes monitoring an output of the hybrid transmission, typically rotational speed of an output shaft $N_O$. Tactical control 130 is executed to determine the input torque commanded (or desired) from the internal combustion engine, $T_{I\_CMD}$, and a desired engine state. Key inputs to tactical control preferably comprise: the transmission output speed, $N_O$, engine input speed, $N_I$, current engine state and allowability of various engine states, the operator torque request, $T_{O\_REQ}$, and the current actual operating range state of the transmission. Exemplary current engine states comprise normal engine operation ('ALL_CYL'), engine operation with deactivated cylinders ('DEACT'), engine fuel-cutoff ('FCO'), and engine fuel-cutoff with cylinder deactivation ('FCO_DEACT'). Engine state allowability is an indication that the engine can be effectively transitioned to one or more of the engine states, typically based upon engine operating conditions. Controlling the input torque from the internal combustion engine comprises controlling operation of the engine to a preferred speed/load operating point to achieve the input torque, in one of the engine states, preferably without violating other operating conditions and requirements, including those related to driveability, fuel economy, and emissions. This is discussed in detail hereinafter.

Figure 1:
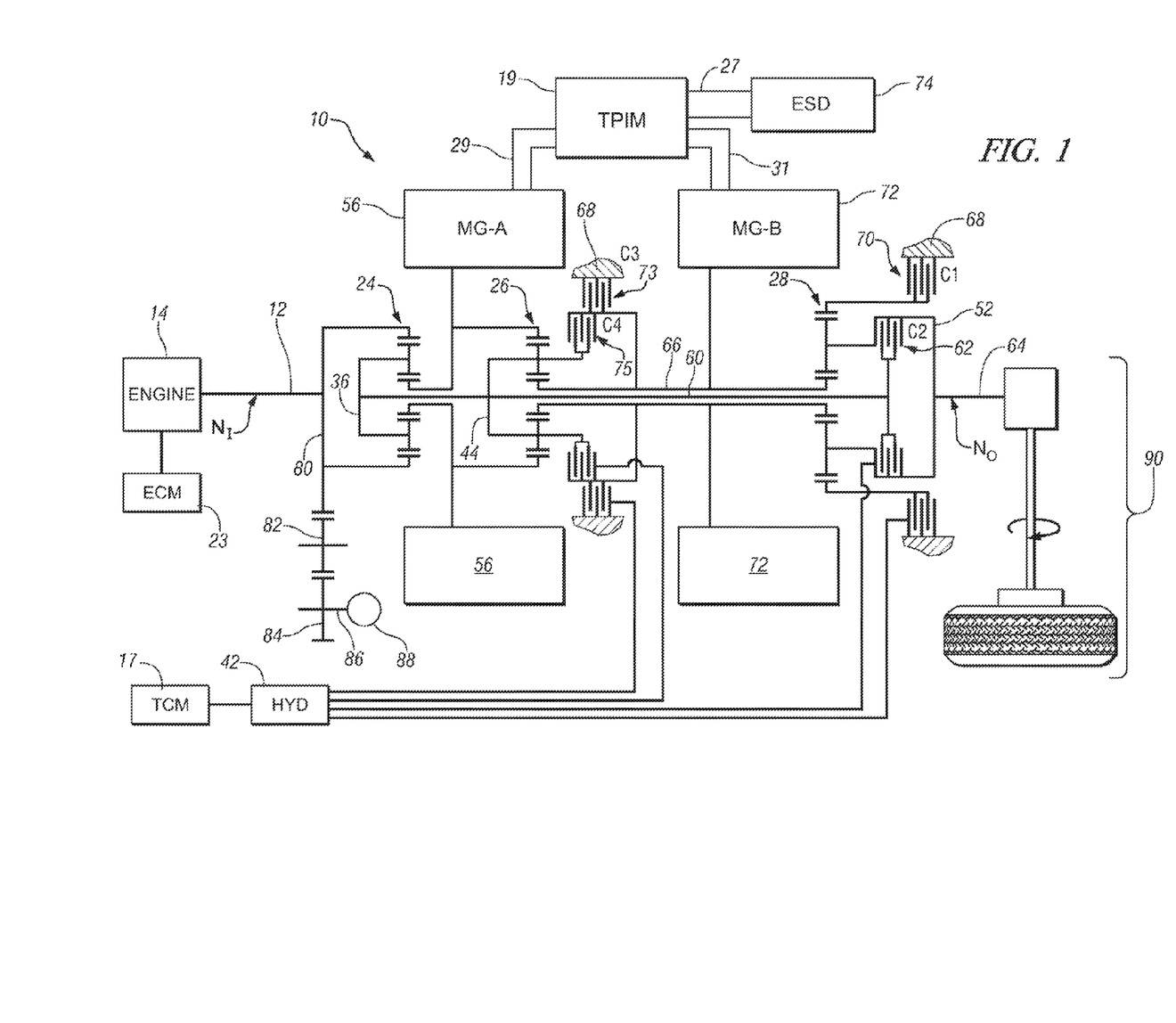
FIG. 1 is a schematic diagram of an exemplary powertrain, in accordance with the present invention.
Figure 2:
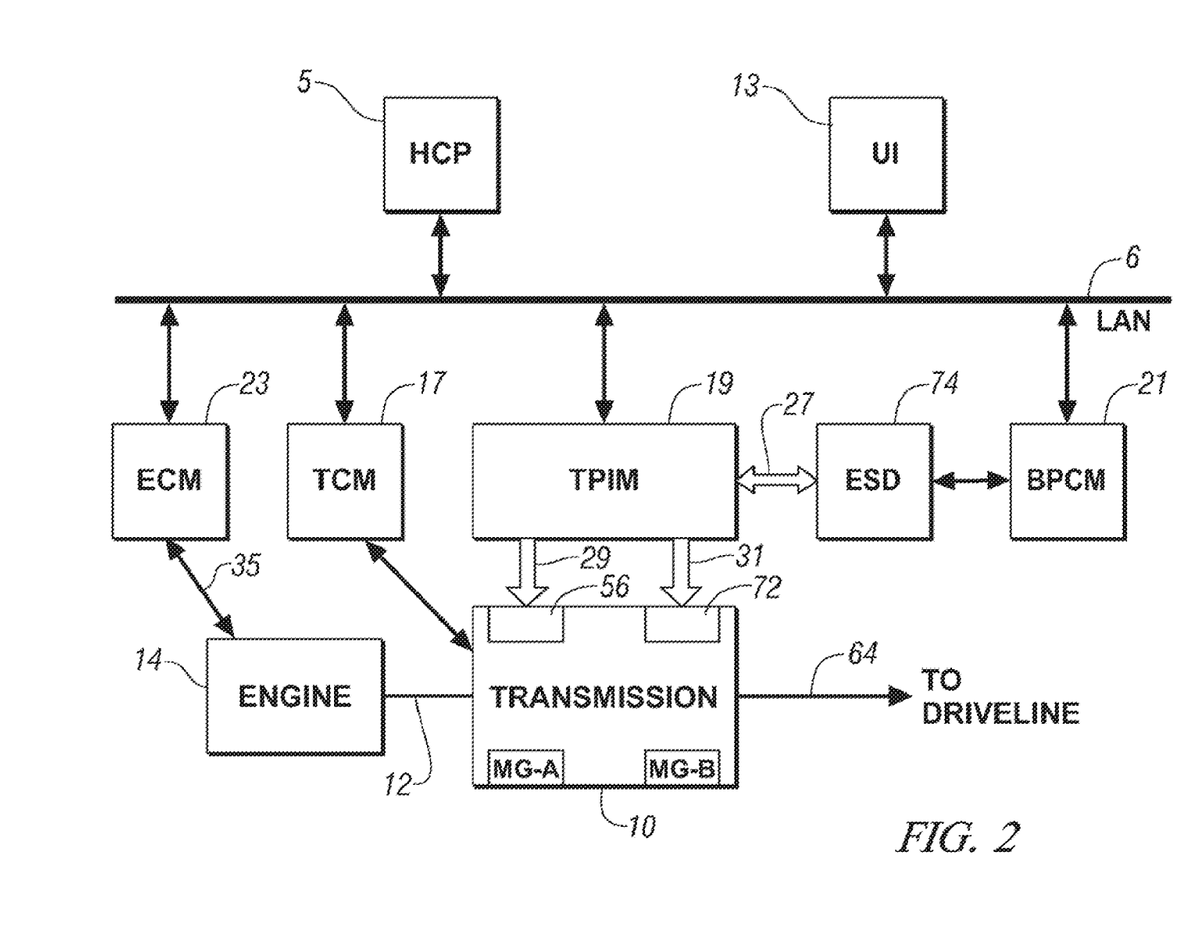
FIG. 2 is a schematic diagram of an exemplary architecture for a control system and powertrain, in accordance with the present invention; and, FIGS. 3-9 are parametric flow diagrams, in accordance with the present invention.

Referring now to FIGS. 1 and 2, an exemplary hybrid powertrain system is depicted, comprising an engine 14, transmission 10, control system, and driveline 90 which has been constructed in accordance with an embodiment of the present invention. The exemplary hybrid powertrain system is configured to execute the control scheme for controlling the engine depicted in FIGS. 3-9. Mechanical aspects of the exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1. The transmission 10 includes an input shaft 12 having an input speed, $N_I$ that is preferably driven by the internal combustion engine 14, and an output shaft 64 having an output rotational speed, $N_O$. The engine 14 has a crankshaft having characteristic speed $N_E$ which is operatively connected to the transmission input shaft 12. When a torque converter clutch device (not shown) operatively connects the engine and transmission, the engine speed $N_E$ and output torque $T_E$ can differ from transmission input speed $N_I$ and engine input torque $T_I$.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module ('TCM') 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

There is first electrical machine comprising a motor/generator 56, referred to as MG-A, and a second electrical machine comprising a motor/generator 72, referred to as MG-B operatively connected to the transmission via the planetary gears. Transmission output shaft 64 is operably connected to a vehicle driveline 90 to provide motive output torque, $T_O$ to vehicle wheels. Each clutch is preferably hydraulically actuated, receiving pressurized hydraulic fluid from a pump, described below, via an electro-hydraulic control circuit 42.

The transmission 10 receives input torque from the torque-generative devices, including the engine 14 and the MG-A 56 and MG-B 72, and referred to as '$T_I$', '$T_A$', and '$T_B$' respectively, as a result of energy conversion from fuel or electrical potential stored in an electrical energy storage device (ESD) 74. The ESD 74 is high voltage DC-coupled to transmission power inverter module ('TPIM') 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request ('$T_{O\_REQ}$') output to driveline 90, the engine input torque $T_I$, clutch torque, ('$T_{CL\_N}$') for the N various torque-transfer clutches C1, C2, C3, C4 of the transmission 10; and motor torques $T_A$ and $T_B$ for MG-A and MG-B. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_EST\_N}$) for each of the N clutches, i.e., C1, C2, C3, and C4, and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power, referred to as a range $P_{BAT\_MIN}$ to $P_{BAT\_MAX}$.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The exemplary two-mode, compound-split, electro-mechanical transmission operates in one of several operating range states comprising fixed gear operation and continuously variable operation, described with reference to FIG. 1, and Table 1, below.

TABLE 1

| Transmission Operating Range State ('Op_range') | Actuated Clutches | |
| --- | --- | --- |
| Mode I—Engine Off (M1_Eng_Off) | C1 70 | |
| Mode I—Engine On (M1_Eng_On) | C1 70 | |
| Fixed Ratio 1 (GR1) | C1 70 | C4 75 |
| Fixed Ratio 2 (GR2) | C1 70 | C2 62 |
| Mode II—Engine Off (M2_Eng_Off) | C2 62 | |
| Mode II—Engine On (M2_Eng_On) | C2 62 | |
| Fixed Ratio 3 (GR3) | C2 62 | C4 75 |
| Fixed Ratio 4 (GR4) | C2 62 | C3 73 |

The various transmission operating range states described in the table indicate which of the specific clutches C1, C2, C3, and C4 are engaged or actuated for each of the operating range states. A first mode, i.e., Mode I, is selected when clutch C1 70 is actuated in order to "ground" the outer gear member of the third planetary gear set 28. The engine 14 can be either on or off. A second mode, i.e., Mode II, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating, typically as a result of the engine being decoupled from the transmission. Other factors outside the scope of the invention affect when the electrical machines 56, 72 operate as motors and generators, and are not discussed herein.

The first and second modes of operation refer to circumstances in which the transmission functions are controlled by one clutch, i.e., either clutch C1 62 or C2 70, and by the controlled speed and torque of the electrical machines 56 and 72, which can be referred to as a continuously variable transmission mode. Certain ranges of operation are described below in which fixed gear ratios are achieved by applying an additional clutch. This additional clutch may be clutch C3 73 or C4 75, as shown in the table, above. When the additional clutch is applied, fixed ratio operation of input-to-output speed of the transmission, i.e., $N_I/N_O$, is achieved. The rotations of machines MG-A and MG-B 56, 72 are dependent on internal rotation of the mechanism as defined by the clutching and proportional to the input speed measured at shaft 12.

In response to an operator's action, as captured by the UI 13, the supervisory HCP control module 5 and one or more of the other control modules determine the operator torque request $T_{O\_REQ}$, to be executed at shaft 64. Final vehicle acceleration is affected by other factors, including, e.g., road load, road grade, and vehicle mass. The operating mode is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and system optimization occurs to optimize system efficiencies to improve fuel economy and manage battery charging.

Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

The exemplary engine 14 comprises a multi-cylinder internal combustion engine selectively operative in several states to transmit torque to the transmission via shaft 12, and can be either a spark-ignition or a compression-ignition engine. The exemplary engine states comprise normal engine operation ('ALL_CYL'), engine operation with deactivated cylinders ('DEACT'), engine fuel-cutoff ('FCO'), and engine fuel-cutoff with cylinder deactivation ('FCO_DEACT'). In normal engine operation, all the engine cylinders are fueled and fired. In the cylinder deactivation state, typically half of the cylinders, e.g., one bank of a V-configured engine, are deactivated. A bank of cylinders is typically deactivated by discontinuing fuel delivery thereto and selectively leaving open exhaust valves to reduce engine pumping losses. In the engine fuel-cutoff state, fuel delivery to all the cylinders is discontinued. In the engine fuel-cutoff with cylinder deactivation state, fuel delivery to all the cylinders is discontinued and a bank of the cylinders is deactivated to reduce pumping losses.

Figure 3:
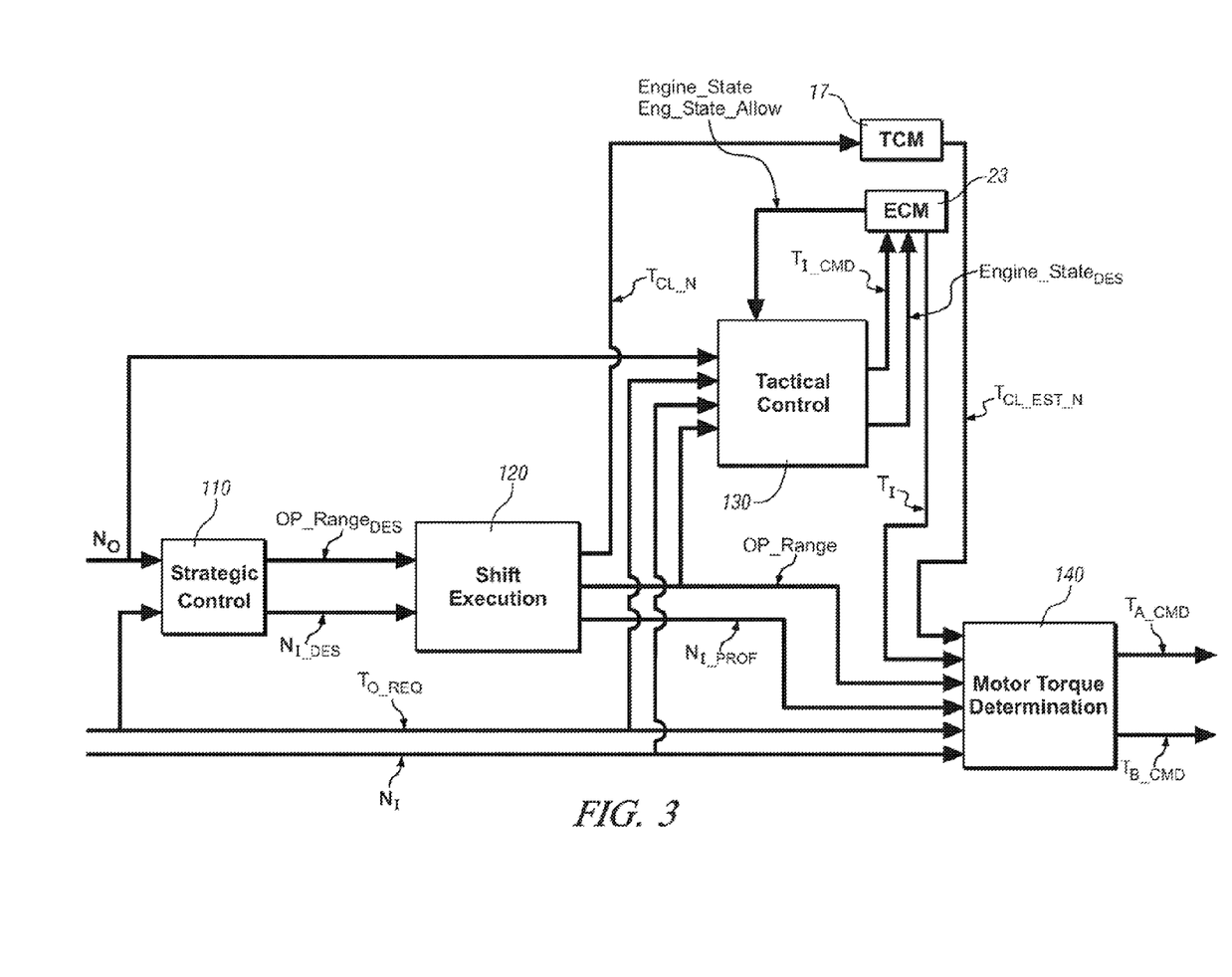

Referring now to FIGS. 3-7, a more detailed description of controlling operation of the hybrid powertrain is described, with reference to the exemplary powertrain system described in FIGS. 1 and 2. Referring to FIG. 3, the method and system described herein comprise an aspect of strategic control optimization, wherein torque outputs from MG-A and MG-B are determined based upon operator torque request $T_{O\_REQ}$, input speed $N_I$, and output speed $N_O$. Strategic control optimization includes strategic control 110, shift execution and control 120, motor torque determination 140, and tactical control 130. Output of tactical control 130 includes the commanded or requested engine input torque, $T_{I\_CMD}$, input to the ECM 23 and a desired engine state, Engine_State$_{DES}$. The ECM 23 determines and outputs a parametric value for engine input torque, $T_I$, for input to the motor torque determination block (Block 140). Other aspects of the overall architecture for strategic optimization and control of the exemplary powertrain are described in co-pending U.S. patent application Ser. No. 11/561,140, which is incorporated by reference, and need not be described herein.

Figure 4:
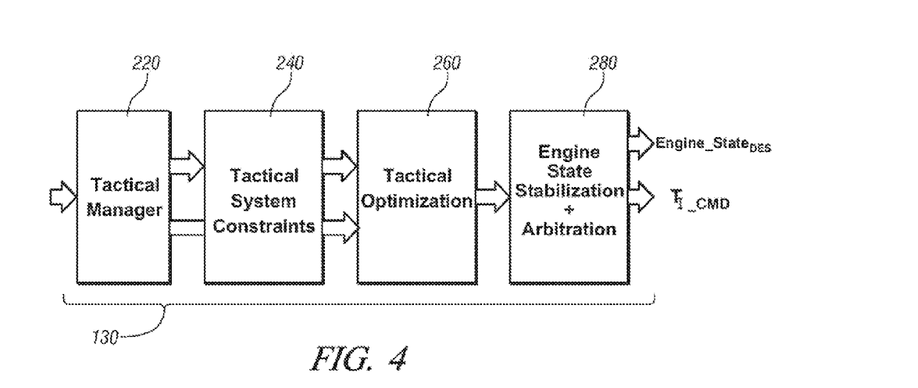

Referring now to FIG. 4, the tactical control method includes monitoring output of the transmission, typically $N_O$. Tactical control 130 is executed to determine the engine input torque commanded (or desired) from the internal combustion engine, $T_{I\_CMD}$, and the desired engine state, Engine_State$_{DES}$, preferably during every 25 ms loop cycle, each which are output to the ECM 23 for execution therein. Key inputs to tactical control 130 preferably comprise the transmission output speed, $N_O$, the engine input speed, $N_I$, current engine state ('Engine_State') and engine state allowability ('Eng_State_Allow') from the ECM 23, the operator torque request, $T_{O\_REQ}$, and the current actual operating range state ('Op_Range') of the transmission as determined previously in Block 120. The engine input torque desired or commanded from the internal combustion engine, $T_{I\_CMD}$ is communicated to the ECM 23 for execution therein. The aforementioned inputs to the tactical control 130 are input to a tactical manager 220, which generates outputs to a tactical system constraint block 240 and to a tactical optimization block 260. Output of the tactical system constraints 240 is also input to the tactical optimization 260. The outputs of tactical optimization 260 are input to the engine state stabilization and arbitration 280, the output of which comprises the engine input torque command, $T_{I\_CMD}$, and the desired engine state, Engine_State$_{DES}$.

Figure 5:
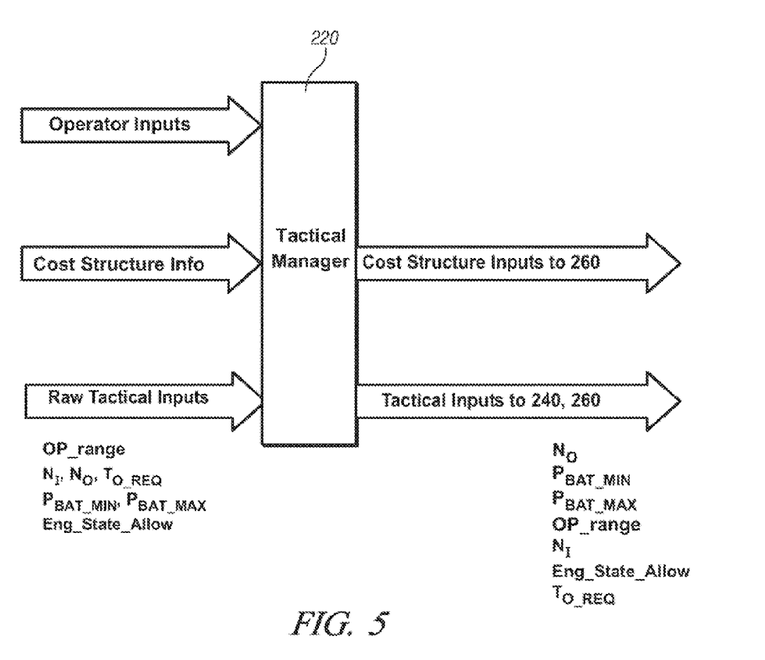

Referring now to FIG. 5, inputs to the tactical manager 220 comprise the raw operator inputs to UI 13, e.g., operator inputs to the accelerator pedal and brake pedal. Cost structure information is communicated, comprising costs associated with operating the engine under specific operating conditions, calculated as described hereinbelow. Raw tactical inputs to the tactical manager 220 comprise current actual parametric data for the transmission operating range state ("Op_range"), $N_I$, $N_O$, and the operator torque request $T_{O\_REQ}$, engine state allowability, and limitations on power output from the ESD 74, i.e., $P_{BAT\_MIN}$, $P_{BAT\_MAX}$. Outputs of the tactical manager 220 include cost structure inputs to the tactical optimization block 260, and tactical inputs of the current actual parametric data for the operating range state ("Op_range"), $N_I$, $N_O$, and the operator torque request $T_{O\_REQ}$ for input to both the system constraints block 240 and the tactical optimization block 260.

Figure 6:
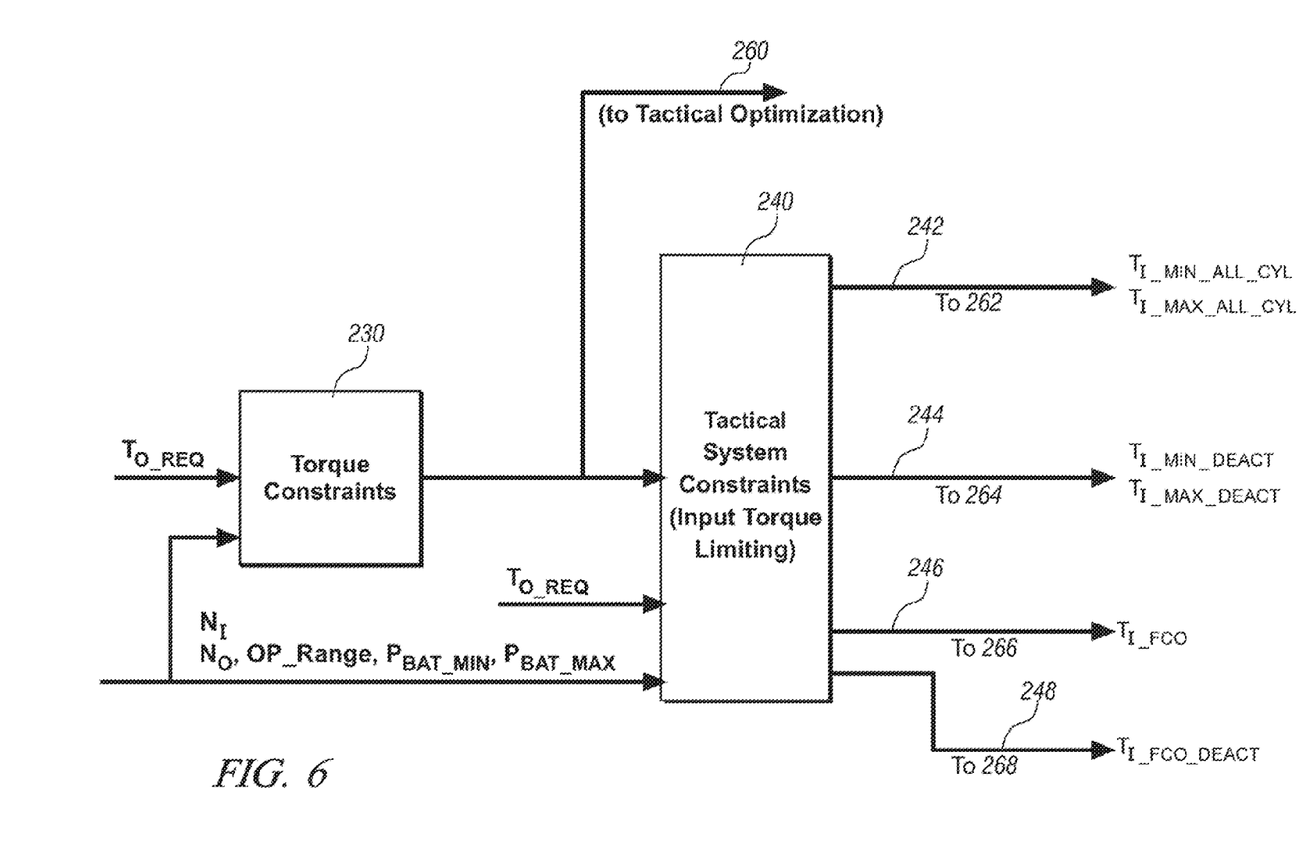
Figure 6B:
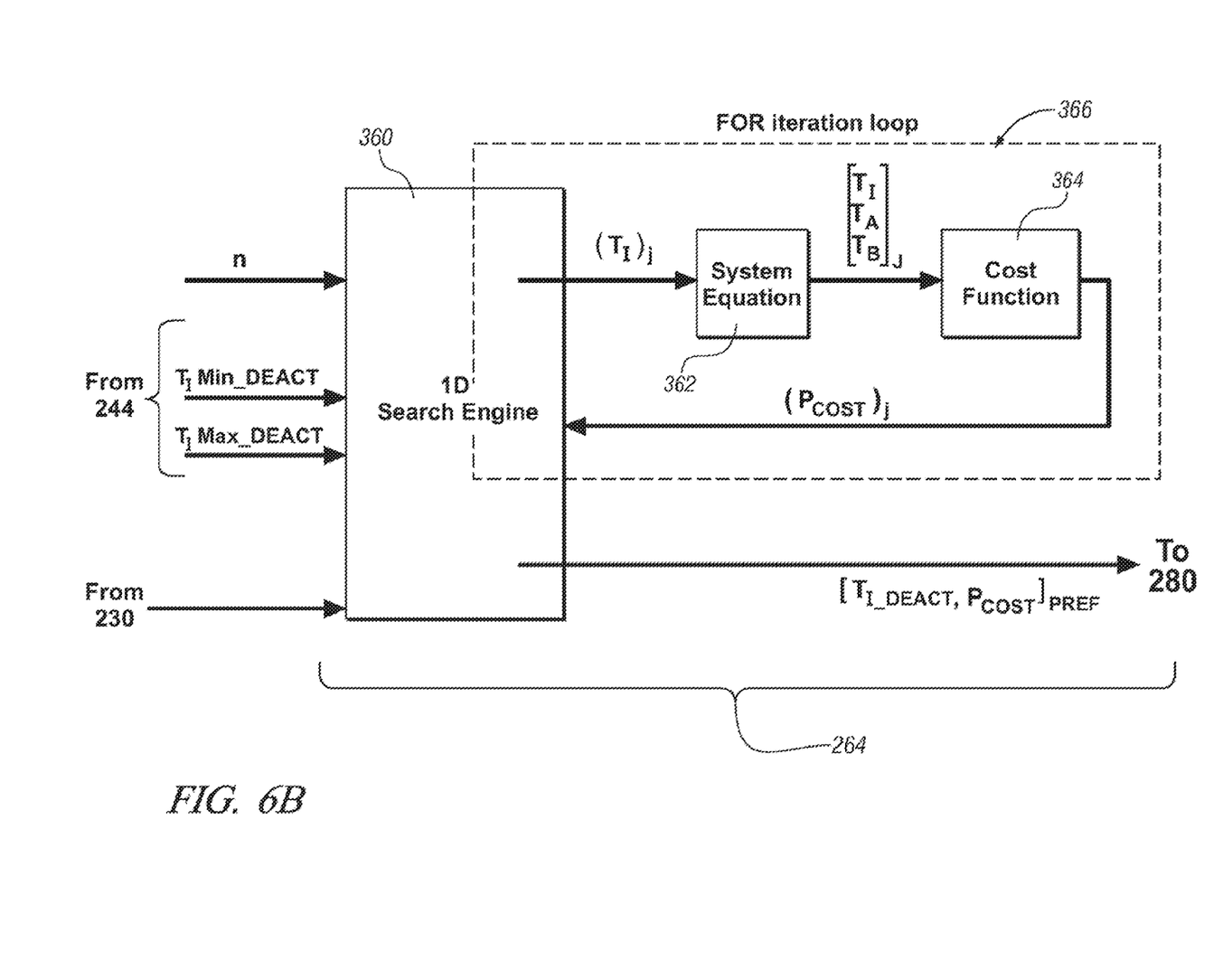
Figure 7:
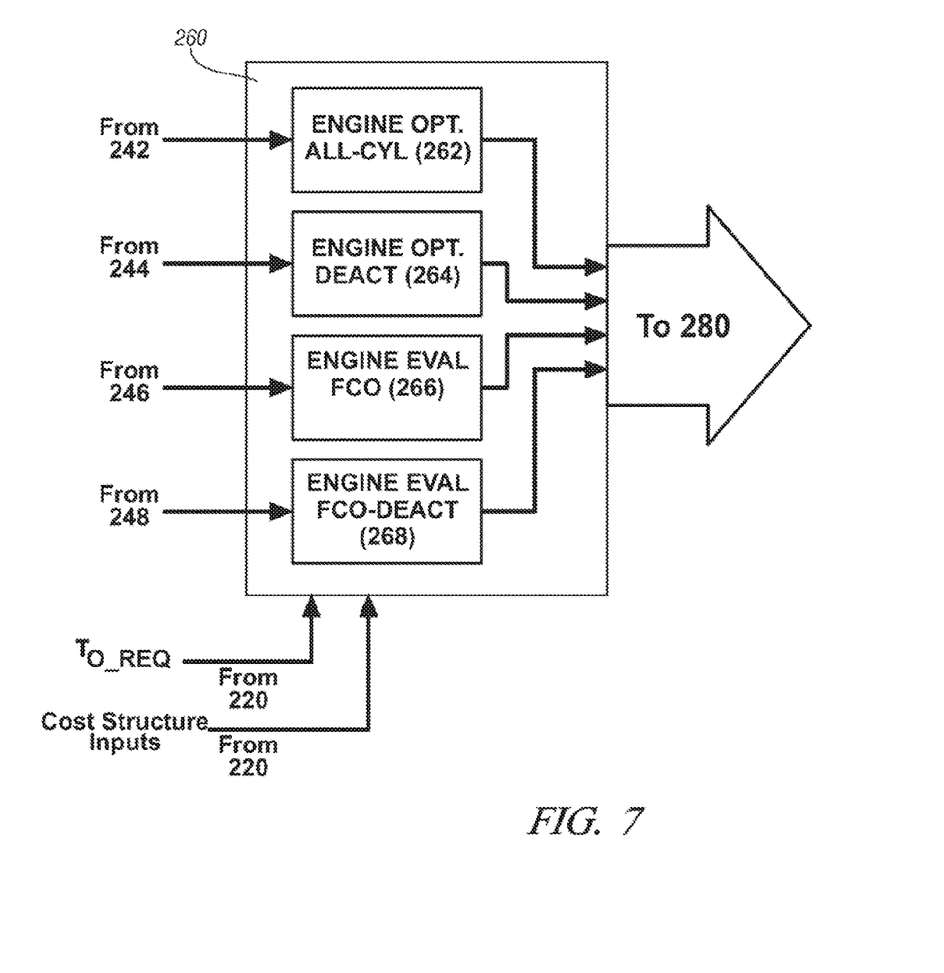

Referring now to FIGS. 6 and 7, the actual parametric data for Op_range, $N_I$, $N_O$, and $T_{O\_REQ}$ and battery power constraints $P_{BAT\_MIN}$ and $P_{BAT\_MAX}$ are input to torque constraints (Block 230) to determine constraints on the output torque, $T_O$, of the system. The torque constraint segment 230 determines maximum and minimum engine input torques for operating in each of the engine states based upon input. The engine input torques for the operating states are referred to as normal state ($T_{I\_MIN\_ALL\_CYL}$, $T_{I\_MAX\_ALL\_CYL}$); cylinder deactivation state ($T_{I\_MIN\_DEACT}$, $T_{I\_MAX\_DEACT}$); the engine fuel cut-off state ($T_{I\_FCO}$); and, engine fuel cut-off and cylinder deactivation state ($T_{I\_FCO\_DEACT}$). This information is communicated to the tactical systems constraints 240, and to the tactical optimization 260. The tactical systems constraints 240 also receives the actual parametric data for Op_range, $N_I$, $N_O$, and $T_{O\_REQ}$ and battery power constraints $P_{BAT\_MIN}$ and $P_{BAT\_MAX}$ as inputs. The tactical systems constraints (Block 240) use the inputs to determine maximum and minimum engine input torque values for each engine operating condition.

The various engine input torque parameters or ranges are output to tactical optimization 260, shown along lines 242, 244, 246, 248, along with the $T_{O\_REQ}$, and the cost structure inputs from block 220. In tactical optimization 260, optimum operating points and associated costs for operating the engine in each operating state are determined based upon the inputs, including normal operation ($T_{I\_MIN\_ALL\_CYL}$, $T_{I\_MAX\_ALL\_CYL}$); cylinder deactivation state ($T_{I\_MIN\_DEACT}$, $T_{I\_MAX\_DEACT}$). For the engine fuel cut-off state ($T_{I\_FCO}$) and the engine fuel cut-off-cylinder deactivation state ($T_{I\_FCO\_DEACT}$), there is an evaluation of system operating costs based upon the engine input torque, typically from the ECM, operator torque request, and the cost structure inputs. Thus, input from 242 is input to normal engine state optimization block 262, input from 244 is input to deactivated cylinders engine state optimization block 264, input from 246 is input to engine fuel-cutoff evaluation block 266, and, input from 248 is input to engine fuel-cutoff and deactivation evaluation block 268.

An optimum operating point preferably comprises an operating point attainable within the range of torque values for each engine state which expends a minimum operating cost, determined in segment 260, shown with reference to FIGS. 8A-8D. The outputs of the optimization segment 260 are input to the engine state stabilization and arbitration segment 280. In the engine state stabilization and arbitration segment 280, one of the engine states input from tactical optimization 260 is selected as a preferred engine state based upon the calculated costs and other factors related to engine, powertrain and vehicle durability and stability. In the engine stabilization and arbitration (Block 280), an optimum operating point, $T_{I\_CMD}$, and operating state (Engine_State$_{DES}$) are determined, and subsequently executed during the forthcoming loop cycle. Typically the selected engine state is the minimum cost operating state.

Figure 8A:
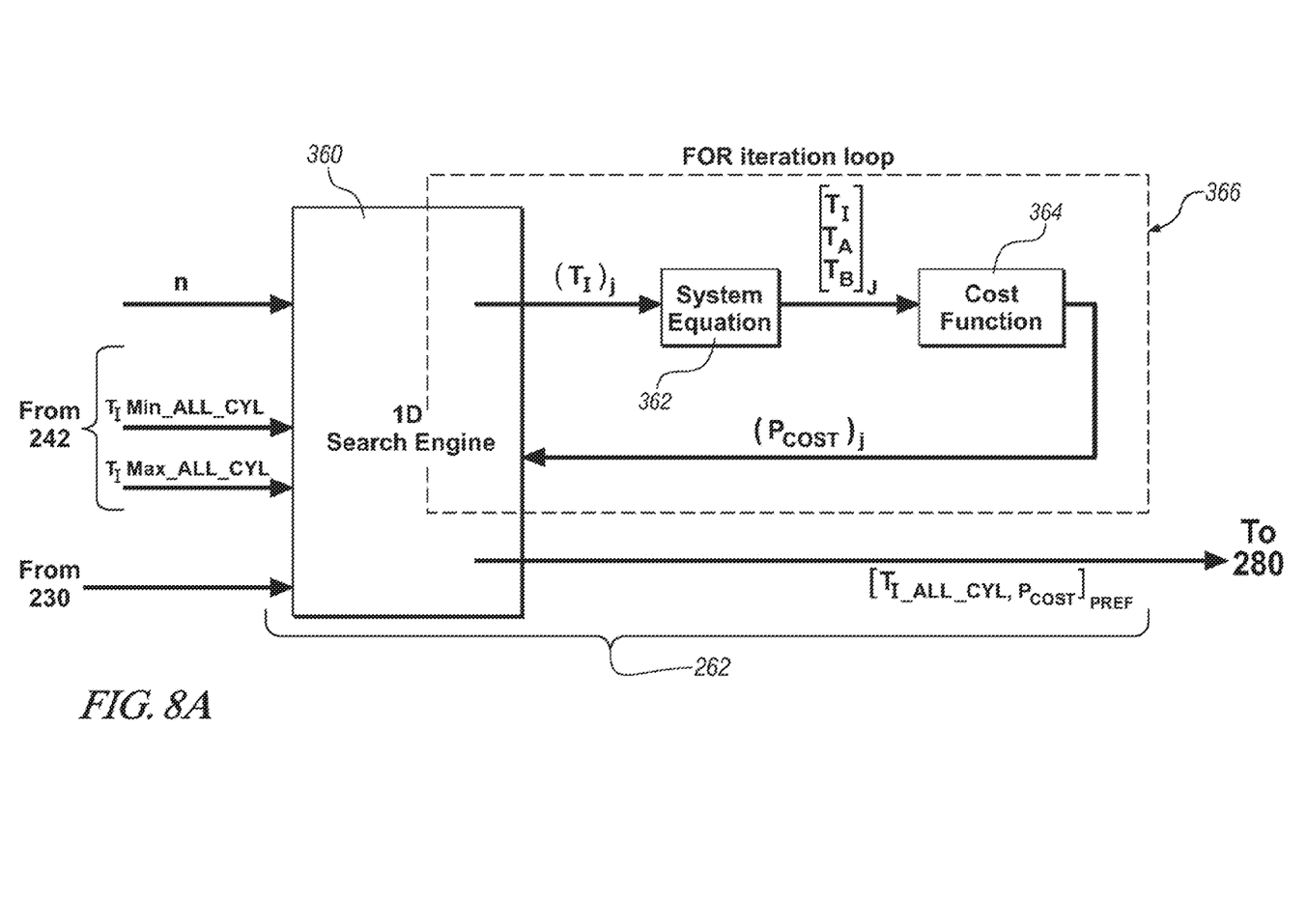

Referring now to FIGS. 8A, 8B, 8C, and 8D, determination of the optimum operating point attainable which expends a minimum operating cost for each of the engine states is now described. Referring to FIG. 8A, the range of permissible engine input torque values to the transmission for normal engine operation, comprising minimum and maximum engine input torques $T_{I\_MIN\_ALL\_CYL}$, $T_{I\_MAX\_ALL\_CYL}$ are input from segment 242 to segment 360 for block 262. Block 360 comprises a one-dimensional search engine ("1D Search Engine"), which iteratively generates a parametric value for engine input torque, $[T_I]_j$ within the range of permissible engine input torques, for execution in an iterative loop 366. The subscript "j" refers to a specific iteration, and ranges in value from 1 to n. The quantity of iterations, n, can be generated by any one of a number of methods, either internal to the search engine, or as a part of the overall method. The permissible engine input torques comprise practical constraints associated with the specific engine embodiment, and are based upon operating characteristics of the specific engine used, with limits related to combustion stability and fuel-cutoff.

The parametric value for engine input torque, $[T_I]_j$ is input to a system equation 362. The system equation comprises a one-dimensional optimization equation from which an optimum parametric value for motor torque $T_A$ is determined. A parametric value for motor torque $T_B$ is determined based upon the determined optimum parametric value for motor torque $T_A$, when the transmission is operating in one of the fixed gear operating modes. The motor torques $T_A$ and $T_B$ and engine input torque $T_I$ are input to a cost function 364, which calculates a cost $(P_{COST})_j$ for operating the exemplary powertrain to achieve the specific parametric engine input torques. The cost determined each iteration is returned and captured, or analyzed, in the search engine 360 depending upon specifics of the search engine 360. The search engine 360 iteratively calculates parametric values for the cost $(P_{COST})_j$ and identifies a preferred cost, which comprises a minimum cost for all the iteratively calculated parametric values in this embodiment. The preferred cost and corresponding value for engine input torque $[T_{I\_ALL\_CYL}, P_{COST}]_{PREF}$ are output to block 280.

The one-dimensional search engine 360 comprises any one of several known methods executed as an algorithm in one of the control modules which is operative to generate parametric values for $T_I$ within the ranges of permissible values, output the parametric values $[T_I]_j$ to the iteration loop 366 to determine a correlated cost, $(P_{COST})_j$, and evaluate the resultant, i.e., $[T_I, P_{COST}]_j$ in the search engine 360. The search engine determines a preferred resultant, i.e., $[T_I, P_{COST}]_{PREF}$, by comparing the resultant from each iteration with a previously determined resultant. When the preferred resultant comprises a minimum value for the correlated cost, the engine 360 selects and captures and stores the lesser value of the resultant and the previously determined resultant. When the search engine has executed the search over the range of parametric values for $T_I$, the final captured resultant comprises the preferred resultant, $[T_I, P_{COST}]_{PREF}$, which is then output to block 280. By way of example, one such search engine iteratively generates inputs over the entire range of permissible engine input torques $T_{I\_MIN}$ to $T_{I\_MAX}$. By way of example, another search engine comprises a heuristic sampling search process wherein a parametric value for $T_I$ is determined for input to the system equation (Block 362), based upon previously determined parametric values for $T_I$ and $P_{COST}$. The one-dimensional search method solves optimization problems looking for the value of the objective function, i.e., the output of the cost equation, to be lower than the value at the current point. Regardless of the search engine utilized, it resides as an algorithm in one of the control modules for execution during ongoing operation of the vehicle.

Referring to FIG. 8B, similar to FIG. 8A, the range of permissible engine input torque values to the transmission for cylinder deactivation operation, comprising minimum and maximum engine input torques $T_{I\_MIN\_DEACT}$, $T_{I\_MAX\_DEACT}$ are input from segment 244 to segment 360 for block 264. Block 360 again comprises a one-dimensional search engine ("1D Search Engine"), which iteratively generates a parametric value for engine input torque, $[T_I]_j$ within the range of permissible engine input torques, for execution in iterative loop 366. The parametric value for engine input torque, $[T_I]_j$ is input to system equation 362 comprising a one-dimensional optimization equation from which parametric values for motor torques $T_A$ and $T_B$ are determined when the transmission is operating in one of the fixed gear operating modes. $T_A$ and $T_B$ and engine input torque $T_I$ are input to cost function 364, which calculates a cost $(P_{COST})_j$. The search engine 360 iteratively calculates parametric values for the cost $(P_{COST})_j$ and identifies a preferred cost, which comprises a minimum cost for all the iteratively calculated parametric values in this embodiment. The preferred cost and corresponding value for engine input torque $[T_{I\_DEACT}, P_{COST}]_{PREF}$ are output to block 280.

Figure 8C:
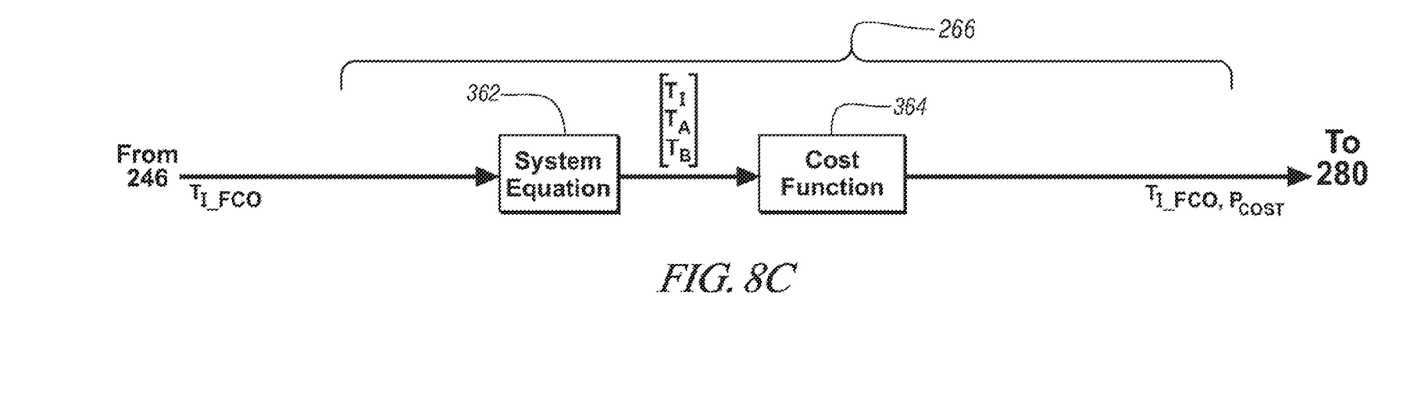

Referring now to FIG. 8C, engine input torque for engine fuel-cutoff $T_{I\_FCO}$ is input from segment 246 and evaluated in block 266. The parametric value for engine input torque, $T_{I\_FCO}$ is input to system equation 362 comprising the one-dimensional optimization equation from which parametric values for motor torques $T_A$ and $T_B$ are determined when the transmission is operating in one of the fixed gear operating modes. $T_A$ and $T_B$ and engine input torque $T_{I\_FCO}$ are input to cost function 364, which calculates a cost $P_{COST}$. The preferred cost and corresponding value for engine input torque $[T_{I\_FCO}, P_{COST}]_{PREF}$ are output to block 280.

Figure 8D:
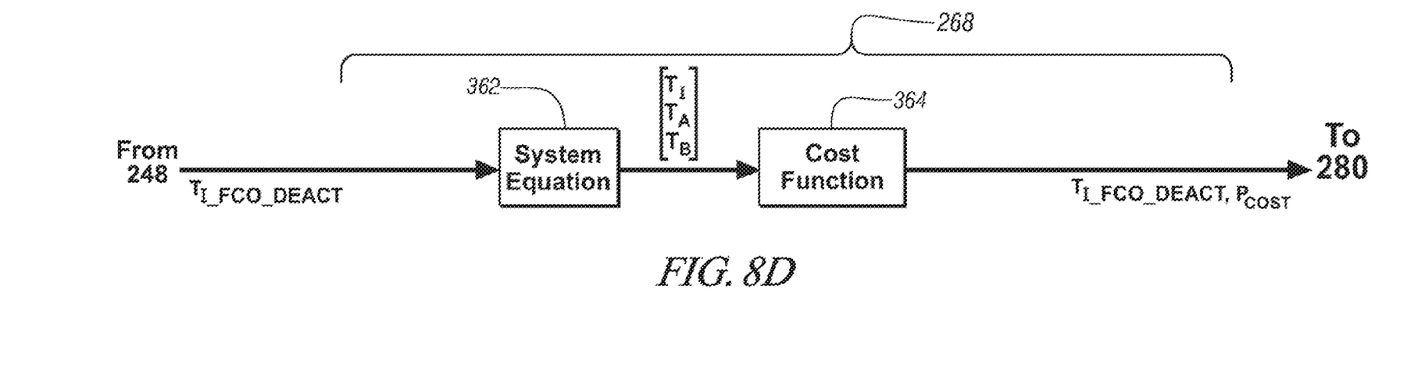

Referring now to FIG. 8D, engine input torque for engine fuel-cutoff-cylinder deactivation operation $T_{I\_FCO\_DEACT}$ is input from segment 248 and evaluated in block 268. The parametric value for engine input torque, $T_{I\_FCO}$ is input to system equation 362 comprising the one-dimensional optimization equation from which parametric values for motor torques $T_A$ and $T_B$ are determined when the transmission is operating in one of the fixed gear operating modes. $T_A$ and $T_B$ and engine input torque $T_{I\_FCO\_DEACT}$ are input to cost function 364, which calculates a cost $P_{COST}$. The preferred cost and corresponding value for engine input torque $[T_{I\_FCO\_DEACT}, P_{COST}]_{PREF}$ are output to block 280.

Figure 9:
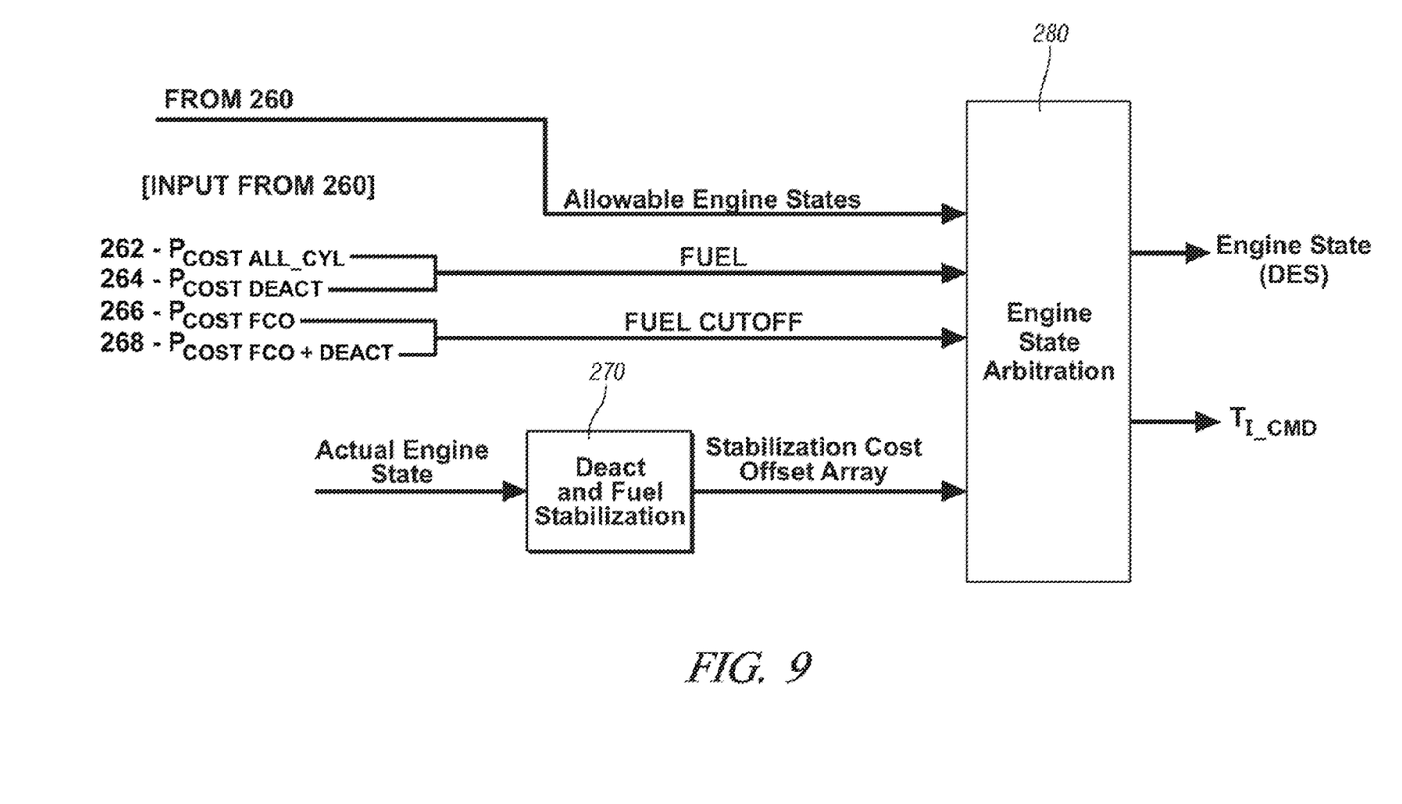

Referring now to FIG. 9, engine state arbitration (Block 280) is now described, the outcome of which comprises determining the desired engine state and desired or commanded engine input torque. In this invention, the input torque transmittable to the transmission 14 is determined for the engine states, which are selectively segmented into the engine fueled operation, i.e., the normal engine state and the cylinder deactivation state, and the engine fuel-cutoff operation, i.e., the engine fuel-cutoff state and the engine fuel-cutoff cylinder deactivation state. Costs for operating the engine and hybrid transmission in the engine states to substantially meet the operator torque request are determined, as described with reference to FIG. 8.

Inputs to engine state arbitration comprise the allowable engine states, and the costs from the optimizations and evaluations from Block 260, including $P_{COST}$(ALL_CYL) from 262, $P_{COST}$(DEACT) from 264, $P_{COST}$(FCO) from 266, and $P_{COST}$(FCO_DEACT) from 268. The current actual engine state is evaluated through block 270, which evaluates and assesses costs which are associated with each change in engine state, which is input to Block 280. Each of the costs $P_{COST}$ (ALL_CYL), $P_{COST}$(DEACT), $P_{COST}$(FCO), and $P_{COST}$(FCO_DEACT) are offset, based upon the output from block 270, and the allowable states are evaluated to identify an engine input torque ($T_{I\_CMD}$) and desired engine state (Engine_State$_{DES}$) for operating the powertrain system which minimizes costs.

In this evaluation, costs $P_{COST}$(ALL_CYL) and $P_{COST}$(DEACT) are compared to identify a preferred operation with the engine fueled. Similarly costs $P_{COST}$(FCO) and $P_{COST}$(FCO_DEACT) are compared to identify a preferred operation with the engine fuel cutoff. The preferred engine fueled operation is compared to the preferred engine fuel cutoff operation, to determine preferred operation based upon costs. The control system commands operation of the engine state to one of the fueled engine operation and the fuel-cutoff operation based upon the costs.

It is understood that modifications are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for operating an internal combustion engine adapted to transmit torque to a hybrid transmission, comprising:
   determining engine input torque transmittable to the hybrid transmission for a plurality of engine states the engine states comprising a fueled-engine operation and an engine fuel-cutoff operation;
   determining costs for operating the engine and hybrid transmission in the engine states to substantially meet an operator torque request; and,
   controlling the engine state to one of the fueled-engine operation and the engine fuel-cutoff operation based upon the costs.

2. The method of claim 1, further comprising determining the engine input torque transmittable to the hybrid transmission for a normal engine state and an engine fuel-cutoff state.

3. The method of claim 2, wherein determining costs for operating the engine and hybrid transmission in the engine states to substantially meet the operator torque request comprises determining a minimum powertrain system operating cost and an associated engine input torque to substantially meet the operator torque request at the minimum powertrain system operating cost for each of the normal engine state and the engine fuel-cutoff state.

4. The method of claim 3, wherein determining the minimum powertrain system operating cost and the associated engine input torque for the normal engine state comprises executing a one-dimensional search over a range of engine input torques.

5. The method of claim 4, wherein the one-dimensional search comprises iteratively selecting parametric values for the engine input torque over the range of engine input torques, and, executing a system equation and a cost function for each of the iteratively selected parametric values for engine input torque.

6. The method of claim 3, comprising executing a system equation and a cost function for an engine fuel-cutoff engine input torque to determine powertrain system operating cost.

7. The method of claim 3, further comprising controlling the engine state to one of the normal state and the engine fuel-cutoff state based upon the preferred costs.

8. The method of claim 1, further comprising determining the engine input torque transmittable to the hybrid transmission for a cylinder deactivation state and for a cylinder-deactivation engine fuel-cutoff state.

9. The method of claim 8, wherein determining costs for operating the engine and hybrid transmission in the engine states to substantially meet the operator torque request comprises determining a minimum powertrain system operating cost and an associated engine input torque to substantially meet the operator torque request at the minimum powertrain system operating cost for each of the cylinder deactivation state and for the cylinder-deactivation state at engine fuel-cutoff.

10. The method of claim 9, wherein determining the minimum powertrain system operating cost and the associated engine input torque for the cylinder-deactivation engine operation comprises executing a one-dimensional search over a range of engine input torques.

11. The method of claim 10, wherein the one-dimensional search comprises iteratively selecting parametric values for the engine input torque over the range of engine input torques, and, executing a system equation and a cost function for each of the iteratively selected parametric values for engine input torque.

12. The method of claim 9, comprising executing a system equation and a cost function for a cylinder-deactivation and fuel-cutoff engine input torque to determine powertrain system operating cost.

13. The method of claim 9, further comprising controlling the engine state to one of the cylinder deactivation operation and the cylinder deactivation and engine fuel-cutoff operation based upon the preferred costs.

14. The method of claim 1, wherein the engine input torque transmittable to the hybrid transmission for each of the engine states is determinable based upon the operator torque request, engine operating conditions, and engine operating constraints.

15. The method of claim 1, further comprising determining engine input torque transmittable to the hybrid transmission for each of a plurality of engine states based upon a current operating range of the hybrid transmission.

16. The method of claim 15, wherein the current operating range of the hybrid transmission comprises one of a plurality of fixed gear modes and two continuously variable modes.

17. Method for operating a hybrid powertrain, the hybrid powertrain comprising an internal combustion engine, an energy storage system, an electric machine, and an electromechanical transmission, the energy storage system and electric machine electrically-operatively coupled for power flow therebetween; and, the engine, electric machine, and the electro-mechanical transmission mechanically-operatively coupled to transmit power therebetween to transmit torque to an output, the method comprising:

determining allowable engine states and an operator torque request;

determining engine input torque transmittable to the electro-mechanical transmission for engine states comprising an engine-fueled operation and an engine fuel-cutoff operation;

determining costs for operating the engine and the electro-mechanical transmission in the engine states to substantially meet an operator torque request; and, controlling the engine state to one of the engine-fueled operation and an engine fuel-cutoff operation based upon the costs.

18. The method of claim 17, wherein the engine input torque for each engine state is determined based upon an engine input speed to the transmission, a transmission output speed, a current operating range state of the transmission, an operator torque request, and available power from an electrical storage device operatively connected to the electrical machine.

19. The method of claim 17, wherein determining costs for operating the engine and the electro-mechanical transmission in the engine states to substantially meet the operator torque request comprises determining a minimum powertrain system operating cost and an associated engine input torque to substantially meet the operator torque request at the minimum powertrain system operating cost for each of the engine-fueled operation and an engine fuel-cutoff operation.

20. The method of claim 19, wherein determining the minimum powertrain system operating cost and the associated engine input torque comprises executing a one-dimensional search whereby parametric values for engine input torque are iteratively selected over the range of engine input torques and a system equation and a cost function are executed for each of the iteratively selected parametric values for engine input torque.

* * * * *